United States Patent
Hara et al.

(10) Patent No.: US 9,644,413 B2
(45) Date of Patent: May 9, 2017

(54) SEAT HINGE STRUCTURE FOR SADDLE RIDING VEHICLE

(71) Applicant: HONDA MOTOR CO., LTD., Minato-Ku, Tokyo (JP)

(72) Inventors: Naoki Hara, Wako (JP); Junji Kikuno, Wako (JP); Jun Nakajima, Wako (JP); Makoto Takitani, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/909,544

(22) PCT Filed: Aug. 6, 2013

(86) PCT No.: PCT/JP2013/071221
§ 371 (c)(1),
(2) Date: Feb. 2, 2016

(87) PCT Pub. No.: WO2015/019413
PCT Pub. Date: Feb. 12, 2015

(65) Prior Publication Data
US 2016/0177607 A1    Jun. 23, 2016

(51) Int. Cl.
*B60N 2/02* (2006.01)
*E05D 11/10* (2006.01)
(Continued)

(52) U.S. Cl.
CPC .............. *E05D 11/1014* (2013.01); *B62J 1/12* (2013.01); *E05D 3/02* (2013.01); *E05Y 2900/50* (2013.01); *E05Y 2900/53* (2013.01)

(58) Field of Classification Search
CPC .......... B62J 1/12; E05D 11/1014; E05D 3/02; E05D 2900/50; E05D 2900/53
See application file for complete search history.

(56) References Cited

FOREIGN PATENT DOCUMENTS

DE    2414937 A1    10/1975
JP    H08-11532 A    1/1996
(Continued)

OTHER PUBLICATIONS

International Search Report mailed Nov. 12, 2013 to corresponding International Application No. PCT/JP2013/071221.
(Continued)

*Primary Examiner* — Lori L Lyjak
(74) *Attorney, Agent, or Firm* — Carrier Blackman & Associates, P.C.; Joseph P. Carrier; William D. Blackman

(57) ABSTRACT

There is provided a seat opening/closing structure for a saddle riding vehicle that suppresses the cost and simplifies the structure to enhance usability. A seat hinge 31 has a vehicle-body-side hinge 51A provided to a vehicle body side, and a seat-side hinge 52 which is turnably secured to the vehicle-body-side hinge 51A through a hinge pin 55. The seat-side hinge 52 has a projecting portion 52h extending to the vehicle-body-side hinge 51A, the vehicle-body-side hinge 51A is provided with a leaf spring 64 having a top portion 64a with which the projecting portion 52h can come into contact, and the projecting portion 52h gets over the top portion 64a of the leaf spring 64 when the seat is opened, whereby the seat-side hinge 52 is supported by the leaf spring 64 and the seat is kept under an open state.

11 Claims, 13 Drawing Sheets

(51) Int. Cl.
*B62J 1/12* (2006.01)
*E05D 3/02* (2006.01)

(56) References Cited

FOREIGN PATENT DOCUMENTS

| JP | H11334667 A | | 12/1999 |
|----|-------------|---|---------|
| JP | 2002178814 A | * | 6/2002 |
| JP | 3593905 B2 | | 11/2004 |
| JP | 2006111180 A | | 4/2006 |
| JP | 2012062970 A | | 3/2012 |

OTHER PUBLICATIONS

Written Opinion of the International Searching Authority mailed Nov. 12, 2013 to corresponding International Application No. PCT/JP2013/071221.
International Preliminary Report on Patentability mailed Feb. 18, 2016 to corresponding International Application No. PCT/JP2013/071221.
Extended European search report with a mailing date of Feb. 23, 2017 issued in the corresponding EP Patent Application 13890887.6.

* cited by examiner (A)

(B)

(A)

(B)

ated to a lower hinge member provided to the vehicle body side through a rotating shaft (see Patent Document 1, for example).
SEAT HINGE STRUCTURE FOR SADDLE RIDING VEHICLE

TECHNICAL FIELD

The present invention relates to a seat hinge structure for a saddle riding vehicle with which a seat can be held at an intermediate position between a full-close position and a full-open position.

BACKGROUND ART

There has been known a seat hinge structure for a saddle riding vehicle in which an upper hinge member provided to the seat side is turnably mounted to a lower hinge member provided to the vehicle body side through a rotating shaft (see Patent Document 1, for example).

Furthermore, there has been known a seat stopper that has the same structure as the seat hinge structure described above and can be held at an intermediate position between the full-close position and the full-open position.

PRIOR ART DOCUMENT

Patent Document

Patent Document 1: Japanese Patent Number 3,593,905

SUMMARY OF THE INVENTION

Problem to be Solved by the Invention

In the patent document 1, the rotating shaft is provided with a rotating damper, a spiral spring, etc., and thus the number of constituent parts of the seat hinge structure and the number of assembling steps for fabrication increase. Therefore, the cost increases. Furthermore, external force in the rotating direction is applied from the seat side to the spiral spring over the whole area from the full-close position of the seat to the full-open position of the seat at all times, and thus it is required to give consideration to the shape, the quality of material, etc. so that the seat hinge structure can withstand long-term use. This also causes increase of the cost. Accordingly, a simpler structure has been required to the seat hinge.

With respect to the seat stopper, the seat is slightly upwards lifted up from the state that the seat is held at the intermediate position, thereby releasing the seat holding state, and thus enhancement of usability for a closing operation of the seat has been required.

The present invention has been implemented in view of the foregoing situation, and has an object to provide a seat hinge structure for a saddle riding type vehicle that can suppress the cost and enhance usability with a simple structure.

Means of Solving the Problem

In order to attain the above object, according to the present invention, a seat hinge structure for a saddle riding vehicle in which an occupant-riding seat (20) is freely opened and closed with respect to a vehicle body through a seat hinge (31) provided to one end of the seat (20), is characterized in that the seat hinge (31) has a vehicle-body-side hinge (51A) provided at the vehicle body side, and a seat-side hinge (52) which is turnably secured to the vehicle-body-side hinge (51A) through a hinge pin (55), the seat-side hinge (52) is provided with a projecting portion (52h) extending to the vehicle-body-side hinge (51A), and the vehicle-body-side hinge (51A) is provided with a leaf spring (64) having a convex portion (64a) capable of coming into contact with the projecting portion (52h), whereby the projecting portion (52h) gets over the convex portion (64a) of the leaf spring (64) when the seat (20) is opened and the seat-side hinge (52) is supported on the leaf spring (64) to keep the seat (20) under an open state.

In the above construction, a plurality of leaf springs (64) may be laminated to form a laminated leaf spring (57).

In the above construction, the plural laminated leaf springs (64) may be configured to be different in thickness.

In the above construction, the leaf spring (64) may be a member having a substantially V-shaped cross-section, and may be disposed so that an opening of the V-shape faces the hinge pin (55) in side view.

In the above construction, the seat (20) may be opened and closed while supported by only the hinge pin (55) over the range from a seat holding state under which the seat (20) is held at a halfway position between a full-close position and a full-open position of the seat (20) to a seat full-open state under which the seat (20) is fully opened.

Furthermore, in the above construction, the leaf spring (64) may come into contact with the projecting portion (52h) and the vehicle-body-side hinge (51A) through a curved face of the leaf spring (64).

In the above construction, a plate (58) for supporting the leaf spring (64) may be provided to the upper face of the vehicle-body-side hinge (51A), the plate (58) may be provided with ribs (58m, 58n) having curved surfaces along the leaf spring (64), and the leaf spring (64) may be supported by the ribs (58m, 58n).

In the above construction, a recess portion (51e) in which the plate (58) is inserted may be formed on the vehicle-body-side hinge (51A), a recess portion (58a) in which the projecting portion (52h) is mounted may be formed on the plate (58), and each of both the recess portions (51e, 58a) may be provided with a drain hole (51h, 58h).

In the above construction, an article storage box (51) provided below the seat (20) has a seal face (51b) which comes into contact with the lower portion of the seat (20), and the seat hinge (31) is disposed outside the seal face (51b).

In the above construction, the plate (58) has an opening portion (58c), and the projecting portion (52h) of the seat-side hinge (52) can be supported by a projecting portion (64a) of the leaf spring (64) which projects from the opening portion (58c).

In the above construction, a plurality of ribs (58m, 58n) may be formed at the edge of the opening portion (58c).

In the above construction, the leaf spring (64) and the plate (58) may be reinforced by glass fiber.

In the above construction, the leaf spring (64) may be formed to be linearly symmetrical in cross-section.

In the above construction, the leaf spring (64) may be pinched between the vehicle-body-side hinge (51A) and the plate (58) while warped.

Furthermore, in the above construction, the plate (58) may have a frontwards ascending front wall (58b) forming the recess portion (58a), a surface (58p) at the front side of the front wall (58b) may face the seat-side hinge (52), the ribs (58m, 58n) may be formed on a surface (58k) at the back side of the front wall (58b), and the surface at the front side may be overlapped with an arc drawn with the hinge pin (55) as the center thereof in side view.

Furthermore, in the above construction, the contact face (52s) of the projecting portion (57h) which can come into contact with the projecting portion (64a) of the leaf spring (64) may be formed to be away from a turning track (69) of the tip of the projecting portion (52h) as the contact face (52s) is moved in an opening direction of the seat (20).

Furthermore, in the above construction, a base portion (52k) of the seat-side hinge (52) may be provided with plural fixing holes (52c, 52d, 52e, 52f) in which bolts (59) extending from the seat (20) side are inserted when the seat-side hinge (52) is fixed to the seat (20), the fixing holes (52c, 52d, 52e, 52f) may comprise fixing holes (52d, 52e) as a pair of round holes provided at a pair of diagonally confronting corner portions out of four corner portions of the substantially rectangular base portion (52k), and fixing holes (52c, 52f) as a pair of long holes provided at the other pair of diagonally confronting corner portions of the four corner portions, and the fixing holes (52d, 52e) as the pair of round holes may be different in inner diameter.

Still furthermore, in the above construction, the fixing holes (52c, 52f) as the pair of long holes may be formed so that one of the fixing holes is longer in the front-and-rear direction of the vehicle body and the other long hole is longer in the vehicle width direction.

Effect of the Invention

According to the present invention, the seat hinge has the vehicle-body-side hinge provided to the vehicle body side, and the seat-side hinge which is turnably secured to the vehicle-body-side hinge through the hinge pin, the seat-side hinge is provided with the projecting portion extending to the vehicle-body-side hinge, the vehicle-body-side hinge is provided with the leaf spring having the projecting portion with which the projecting portion comes into contact, and the projecting portion gets over the projecting portion of the leaf spring when the seat is opened, whereby the seat-side hinge is supported by the leaf spring and thus the seat is kept under the open state. Therefore, according to the present invention, it is unnecessary to wind the rotating damper, the spiral spring or the like around the hinge pin unlike prior arts, and the seat-side hinge is supported by the spring, so that the number of parts can be reduced. Furthermore, according to the present invention, when the seat which is opened at an intermediate position between the full-close position and the full-open position is closed, it is unnecessary to temporarily further move the seat in the open direction unlike prior arts. Therefore, by only the operation of moving the seat in the closing direction to warp the leaf spring, the seat can be easily closed from the holding position by using its own weight. Accordingly, the seat hinge can be configured in a simple structure, the cost can be reduced and the usability of the saddle riding vehicle can be enhanced.

Furthermore, the leaf springs are provided in the form of lamination (stack). Therefore, the whole elastic force of the leaf springs can be easily increased. Accordingly, the seat can be held at the intermediate position between the full-close position and the full-open position without plastic deformation of the leaf springs and without any member having high elastic force. Accordingly, the seat hinge can be structured at a lower price. Furthermore, the elastic force of the leaf springs can be easily adjusted by only changing the plate thickness, shape and number of the leaf springs in accordance with the variation of the seat weight caused by variation of specification, size, shape, etc. of the seat.

Furthermore, the leaf spring is the member having the substantially V-shaped cross-section, and disposed so that the opening of the V-shape faces the hinge pin in side view. Therefore, the load applied to the leaf spring can be dispersed by both the end portions of the V-shape. Accordingly, the leaf spring can be suppressed from being plastically deformed.

Furthermore, in the range from the holding state (under which the seat is halfway held at a halfway position (some middle position) between the full-close position and the full-open position) to the full-open state, the seat is opened and closed while supported by only the hinge pin, so that the seat hinge can be designed to have a simple structure. Furthermore, in the above range, the projecting portion does not come into contact with the leaf spring, so that the leaf spring can be suppressed from being worn away. Accordingly, the leaf spring can be configured at the minimum cost.

The leaf spring comes into contact with the projecting portion and the vehicle-body-side hinge through the curved surface thereof, so that the leaf spring can be smoothly warped, and the load to be applied to the leaf spring can be dispersed and applied to the leaf spring. Accordingly, the leaf spring can be prevented from being worn away.

Furthermore, the plate for supporting the leaf spring is provided on the upper face of the vehicle-body-side hinge, the plate is provided with the ribs each having the curved surface along the leaf spring, and the leaf spring is supported by the ribs. Therefore, the leaf spring can be smoothly slid while suppressing local impingement of the leaf spring against the ribs.

The recess portion in which the plate is inserted is formed on the vehicle-body-side hinge, the recess portion in which the projecting portion is accommodated is formed on the plate, and these recess portions have the drain holes. Therefore, liquid such as rain water, etc. which adhere to the projecting portion of the seat-side hinge and the plate can be collected and discharged from the drain holes. Accordingly, the leaf springs fixed to the plate can be suppressed from being corroded.

The article storage box provided below the seat has the seal face which comes into contact with the lower seat, and the seat hinge is disposed outside the seal face. Therefore, the storing space of the article storage box can be increased by providing the seat hinge between the seat front portion and the seal face.

Furthermore, the plate has the opening portion, and the projecting portion of the seat-side hinge can be supported by the projecting portion of the leaf spring which projects from the opening portion. Therefore, the seat-side hinge can be supported by the projecting portion of the leaf spring while the leaf spring is pinched and held by the vehicle-body-side hinge and the plate.

A plurality of ribs are formed at the edge of the opening portion. Therefore, the edge of the opening portion can be reinforced by the ribs, so that the rigidity of the plate can be enhanced and the load of the leaf springs can be supported.

The resin reinforced by the glass fiber is used for the plate, and thus the rigidity and abrasion resistance of the plate can be enhanced.

Furthermore, the leaf spring is formed to be linearly symmetric in cross-section. Therefore, when the projecting portion gets over the projecting (convex) portion of the leaf spring, the load occurring in the leaf spring can be equally dispersed to the linearly symmetrical parts, so that the plastic deformation can be suppressed and the durability can be enhanced.

Furthermore, the plate has the frontwards ascending front wall forming the recess portion, the surface at the front side of the front wall faces the seat-side hinge, the ribs are formed on the surface at the back side of the front wall, and the surface at the front side is overlapped with the arc drawn with the hinge pin as the center in side view. Therefore, the distance between the projecting portion of the turning seat-side hinge and the front wall of the plate can be reduced while keeping the distance to a fixed distance, and the seat hinge can be miniaturized.

Furthermore, the contact face of the projecting portion which can come into contact with the projecting portion of the leaf spring is formed to be away from the turning track (locus) of the tip of the projecting portion as the tip of the projecting portion is moved in the opening direction of the seat. Therefore, the contact face of the projecting portion can be gradually brought into contact with the top portion of the leaf spring, and the leaf spring can be gradually warped, so that increase of the force applied when the seat is opened can be moderated, and the seat can be more easily opened. Accordingly, usability of the seat can be enhanced.

Furthermore, the base portion of the seat-side hinge is provided with the plural fixing holes in which the bolts extending from the seat side are inserted when the seat-side hinge is secured to the seat, the fixing holes comprise the fixing holes as a pair of round holes provided at a pair of diagonally confronting corer portions out of the four corner portions of the substantially rectangular base portion, and the fixing holes as a pair of long holes provided at the other pair of diagonally confronting corner portions out of the four corner portions, and the fixing holes as the pair of round holes are different in inner diameter from each other. Therefore, even when there is some manufacture irregularity in the intervals among the plural bolts extending from the seat side, the manufacture irregularity can be absorbed by the pair of long holes and the larger round hole. Accordingly, the seat-side hinge can be easily assembled to the seat.

Furthermore, one of the fixing holes as the pair of long holes is designed to be longer in the front-and-rear direction of the vehicle body, and the other fixing hole is designed to be longer in the vehicle width direction. Therefore, the manufacture irregularity in the intervals in the front-and-rear direction of the vehicle body and the vehicle width direction among the plural bolts extending from the seat side can be absorbed.

BRIEF DESCRIPTION OF THE DRAWINGS

FIG. 8 is a diagram showing the hinge plate, wherein FIG. 8(A) is a plan view of the hinge plate and FIG. 8(B) is a view taken from an arrow B of FIG. 8(B).

FIG. 11 is a first action diagram showing the operation of the seat-side hinge, wherein FIG. 11A is a cross-sectional view showing the seat hinge at the seat full-close position shown in FIG. 1, FIG. 11(B) is a first cross-sectional view showing a state that the seat-side hinge is halfway rotated, and FIGS. 11(A), (B) are left side views.

FIG. 12 is a second action diagram showing the operation of the seat-side hinge, wherein FIG. 12(A) is a second cross-sectional view showing a state that the seat-side hinge is halfway rotated, FIG. 12(B) is a cross-sectional view showing the seat hinge at an intermediate position B of the seat shown in FIG. 1, and FIGS. 12(A), (B) are left side views.

MODE FOR CARRYING OUT THE INVENTION

An embodiment according to the present invention will be described hereunder with reference to the drawings.

Figure 1:
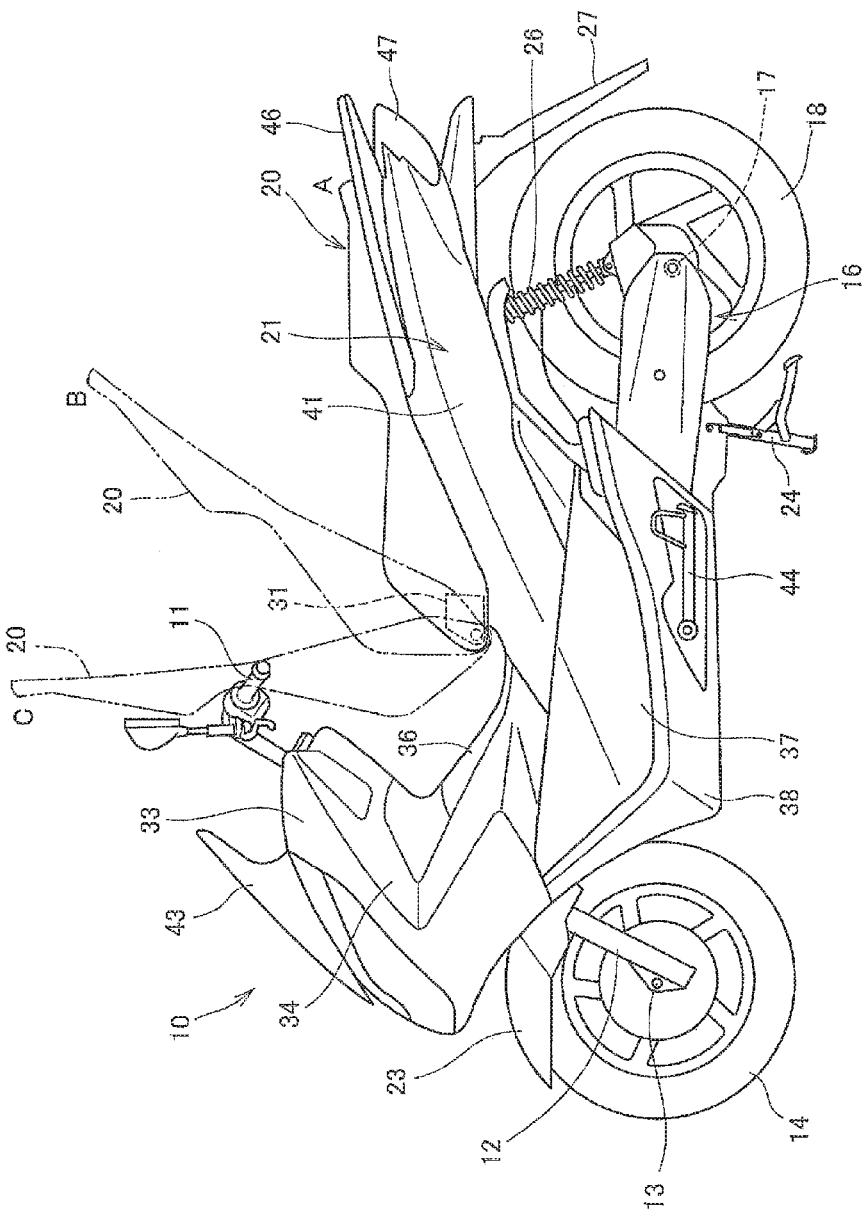
FIG. 1 is a left side view showing a two-wheeled motor vehicle having a seat hinge structure according to an embodiment of the present invention.

FIG. 1 is a left side view showing a two-wheeled motor vehicle having a seat hinge structure according to an embodiment of the present invention.

The two-wheeled motor vehicle 10 is a scooter type saddle riding vehicle that has a front fork 12 steered by a bar handle 11, a front wheel 14 supported through an axle 13 at the lower end portion of the front fork 12, a power unit 16 serving as a driving source supported at the lower portion of the center portion of the vehicle body so as to be swingable in the up-and-down direction, a rear wheel 18 secured to an output shaft 17 provided to the rear end portion of the power unit 16, an openable/closable seat 20 provided to the whole area from the upper portion of the center portion of the vehicle body to the upper portion of the rear portion of the vehicle body, and a vehicle body cover 21 covering a vehicle body frame serving as a framework.

The front wheel 14 is covered from the upper side thereof by a front fender 23. A main stand 24 is secured to the lower portion of the power unit 16, and the rear end portion of the power unit 16 is joined to the rear portion of the vehicle body frame through a cushion unit 26. The rear wheel 18 is covered from the upper side thereof by a rear fender 27.

A storage box is disposed at the lower side of the seat 20. The front end portion of the seat 20 is joined to the upper portion of the front end portion of the storage box through a seat hinge 31, and the rear end portion of the seat 20 is releasably fitted to a seat lock mechanism provided to the rear end portion of the storage box under a close state. The seat 20 is opened between a full-close position A indicated by as a solid line to a position C indicated by an imaginary line, and can be held under an open state at an intermediate position B between the full-close position A and the position C.

The vehicle body cover 21 has a front cover 33 provided to the front portion of the vehicle body, a pair of right and left leg shields 34, 34 (only the leg shield 34 at the left side is shown) which are arranged at the rear side of the front cover 33 to cover the front side of the leg portions of a rider, a center cover 36 extending from the gap between the right and left shields 34, 34 to the lower side of the front end portion of the seat 20, a pair of right and left floor steps 37, 37 (only the front step 37 at the left side is shown) extending downwards and rearwards from the lower ends of the right and left shields 34, 34, a pair of right and left floor skirts 38, 38 (only the floor skirt 38 at the left side is shown) extending downwards from both the side edge portions of the right and left floor steps 37, 37, and a pair of right and left body covers 41, 41 (only the body cover 41 at the left side is shown) extending from the upper portions of the rear portions of the right and left floor steps 37, 37 to the rear upper side.

A window screen 43 is provided to the upper portion of the front cover 33. A side stand 44 secured to the vehicle body frame is disposed at the side of the floor skirt 38. A grab rail 46 is disposed at the upper side of the rear portion of the body cover 41 so as to surround the sides of the rear portion and rear side of the seat 20. A tail lamp 47 is disposed between the rear end portions of the right and left body covers 41, 41.

Figure 2:
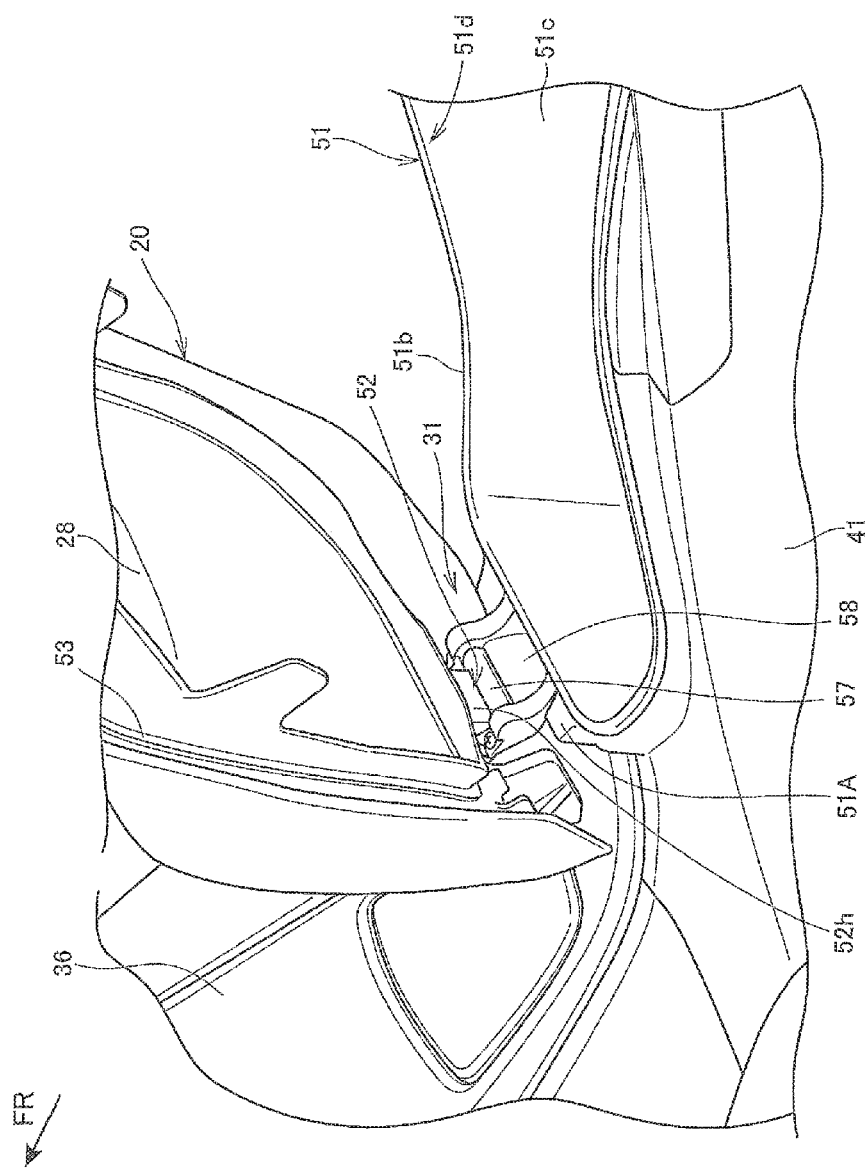
FIG. 2 is a perspective view showing the seat hinge and the surrounding portion thereof.

FIG. 2 is a perspective view showing the seat hinge 31 and the surrounding portion thereof, and shows a state that the seat 20 is held at the intermediate position B described with reference to FIG. 1.

In FIG. 2, a vehicle-body-side hinge 51A constituting the seat hinge 31 is integrally provided to the front end portion of the storage box 51, and a seat-side hinge 52 constituting the seat hinge 31 is secured to the front end portion of the seat 20. As described above, the seat 20 is secured to the front end portion of the storage box 51 through the seat hinge 31 so as to be openable and closable.

An annular seal face 51*b* is formed at the peripheral edge of an opening 51*d* of the storage main body 51*c* of the storage box 51, and an endless seal rubber 53 is secured to the seat 20, more specifically to the bottom face of a bottom plate 28 constituting the seat 20 so as to come into close contact with the seal face 51*b*. The vehicle-body-side hinge 51A is disposed at the front side of the seal face 51*b* of the storage box 51 with respect to the vehicle body.

Figure 3:
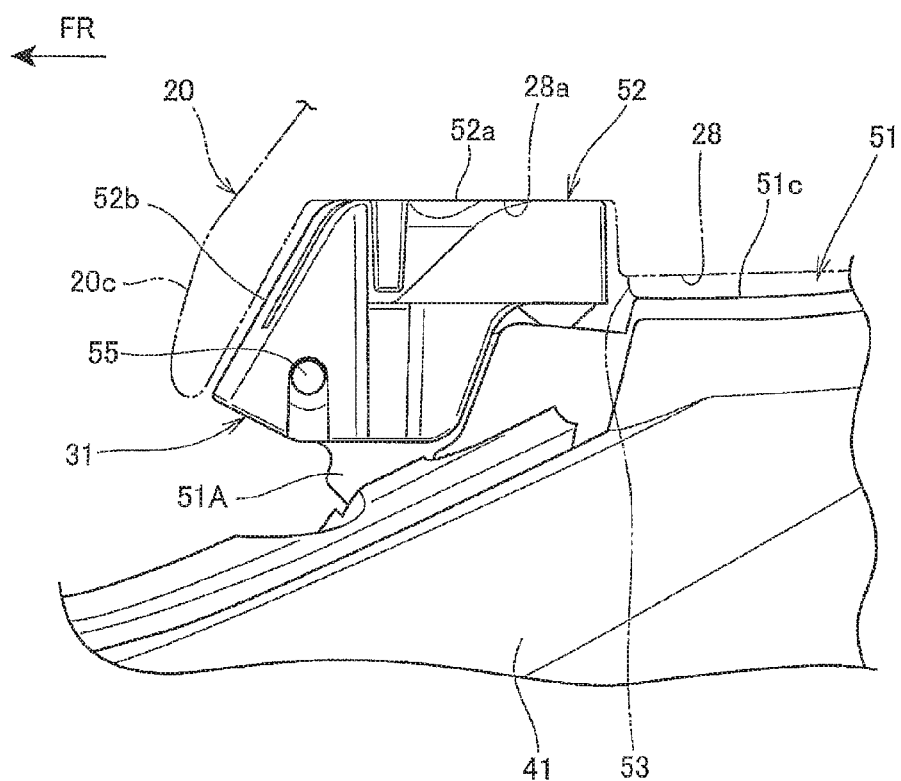
FIG. 3 is a left side view showing the seat hinge and the surrounding portion thereof.

FIG. 3 is a side view showing the seat hinge 31 and the surrounding portion thereof.

The vehicle-body-side hinge 51A integrally projects from the box-shaped storage main body 51 as the storage portion of the storage box 51 to the front side of the vehicle body, a hinge pin 55 penetrates through the front end portion of the vehicle-body-side hinge 51A so as to extend in the vehicle width direction, and the seat-side hinge 52 is swingably supported on the hinge pin 55.

The upper face 52*a* of the seat-side hinge 52 is fixed to a recess portion 28*a* formed at the lower portion of the front end portion of the bottom plate 28 of the seat 20 by a bolt and a nut, and a sloped front face 52*b* is covered from the front side thereof by the front end portion 20*c* of the seat 20.

Figure 4:
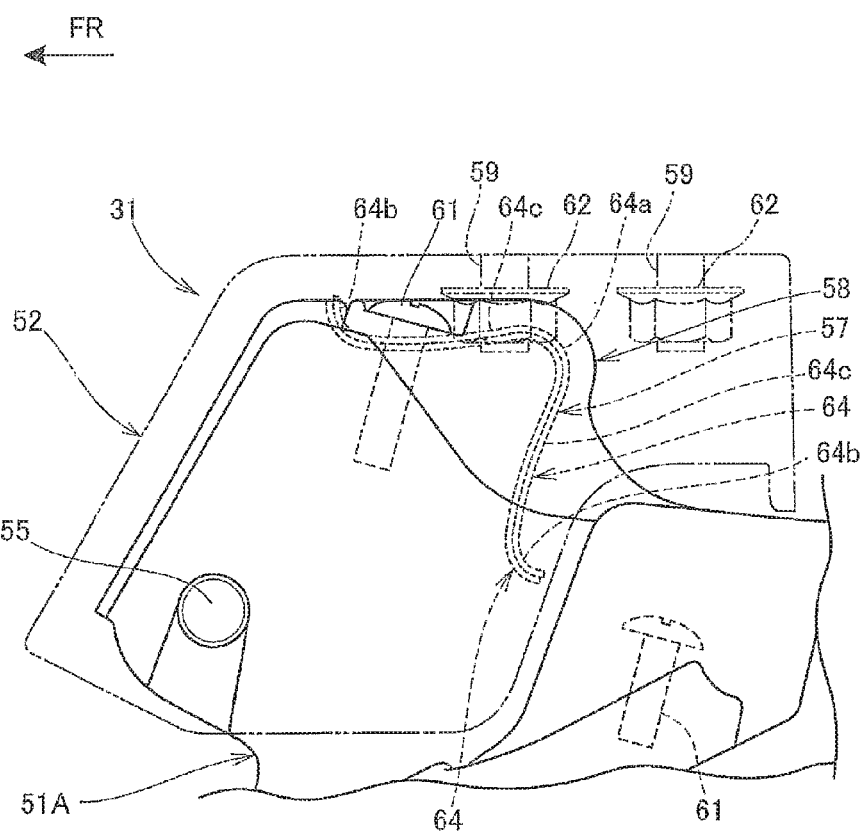
FIG. 4 is a left side view showing constituent parts of the seat hinge.

FIG. 4 is a side view showing constituent parts of the seat hinge 31.

The seat hinge 31 has a laminated leaf spring 57 capable of supporting the seat-side hinge 52, and a hinge plate 58 for pinching the laminated leaf spring 57 in cooperation with the vehicle-body-side hinge 51A. The hinge plate 58 is fixed to the vehicle-body-side hinge 51A with plural screws (vises) 61. Reference numeral 59 represents a bolt projecting from the bottom plate 28 (see FIG. 3) of the seat 20 (see FIG. 1), and reference numeral 62 represents a nut to which the bolt 59 is threadably fitted to fix the seat-side hinge 52 to the seat 20.

The laminated leaf spring 57 is obtained by laminating plural metal leaf springs 64. The leaf spring 64 is formed to be substantially V-shaped and axially (linearly) symmetrical in side view, and integrally constructed by a top portion 64*a* having a curved center, curved base portions 64*b*, 64*b* at both the end portions thereof, and sloped portions 64*c*, 64*c* through which the top portion 64*a* and the base portions 64*b*, 64*b* are connected to each other. The top portion 64*a* and the base portions 64*b* are formed to be arc-shaped or substantially arc-shaped. The slope portion 64*c* is a moderately curved or planar portion. The laminated leaf spring 57 is assembled to the seat hinge 31 so that the opening of the V-shape faces the hinge pin 55.

The upper portion of the front portion of the hinge plate 58 are shaped to be substantially along the top portion 64*a* and the sloped portions 64*c* of the laminated leaf spring 57 in side view.

As described above, stress occurring in the laminated leaf spring 57 can be reduced to a smaller level as compared with stress occurring in a single leaf spring having the same thickness as the laminated leaf spring 57 by laminating the plural leaf springs 64. Accordingly, plastic deformation of the laminated leaf spring 57 can be suppressed. Furthermore, when the laminated leaf spring 57 is configured to have the same deflection (warp) amount as a single leaf spring having the same total plate thickness, the laminated leaf spring 57 can be miniaturized. Furthermore, when the number of leaf springs 64 is increased, the load which can be supported by the laminated leaf spring 57 can be easily increased. Therefore, an inexpensive member can be used to generate the same elastic force.

Figure 5:
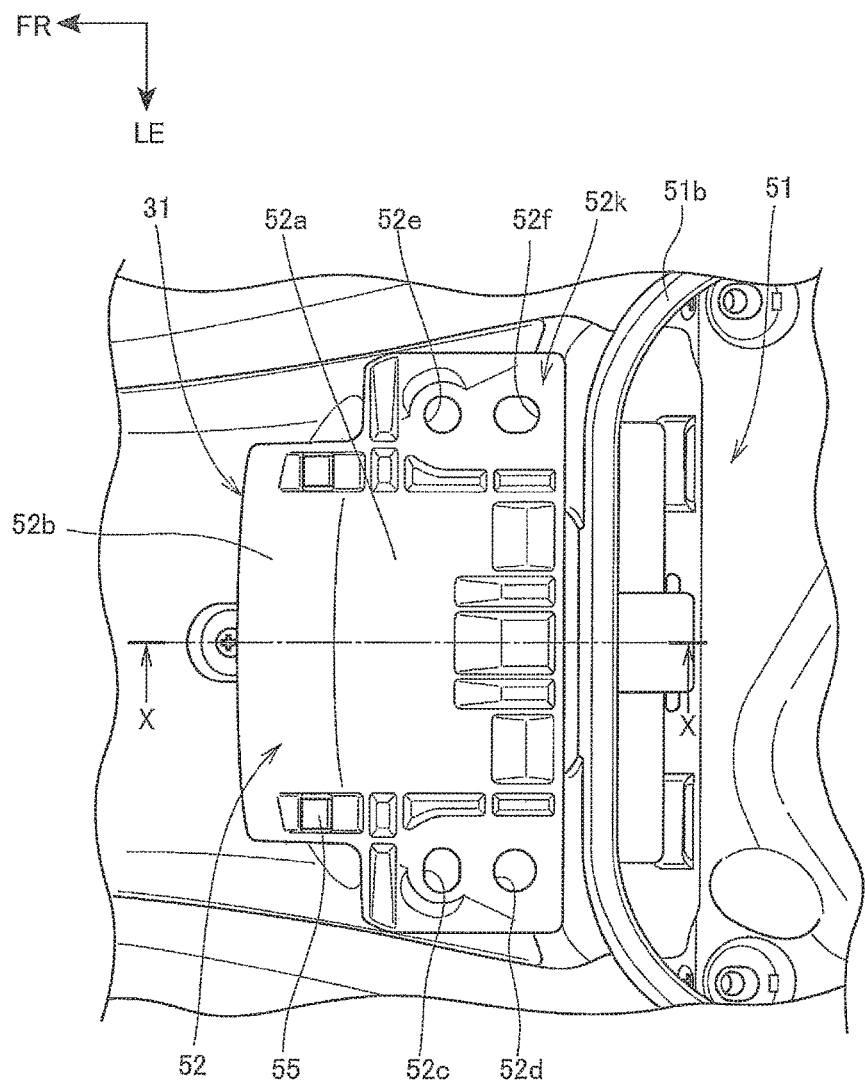
FIG. 5 is a plan view showing the seat hinge and the surrounding portion thereof.

FIG. 5 is a plan view showing the seat hinge 31 and the surrounding portion thereof.

Plural seat fixing holes 52*c*, 52*d*, 52*e*, 52*f* are formed at the corner portions of the upper face 52*a* of a substantially rectangular upper base portion 52*k* of the seat-side hinge 52 so as to fix the seat-side hinge 52 to the seat 20 (see FIG. 1). The seat fixing hole 52*c* at the front left side is a long hole elongated in the vehicle width direction, the seat fixing hole 52*d* at the rear left side and the seat fixing hole 52*e* at the front right side are round holes, and the seat fixing hole 52*f* at the rear right side is a long hole elongated in the front-and-rear direction of the vehicle body. With respect to the seat fixing holes 52*d*, 52*e* as the two round holes, the seat fixing hole 52*d* is larger in inner diameter than the seat fixing hole 52*e*.

The seat-side hinge 52 is supported at plural points (four support portions) by bolts projecting from the seat 20 and nuts. As described above, the long holes are formed at the two support portions out of the four support portions, and these long holes are provided at a pair of diagonally confronting corner portions out of the four corner portions. The seat fixing holes 52*c*, 52*f* are configured as the long holes, and the seat fixing hole 52*d* is configured to be larger than the seat fixing hole 52*e*. Therefore, even when there is some manufacture irregularity (variation in manufacturing processes) in the intervals among plural bolts extending from the bottom plate 28 of the seat 20 (see FIG. 2) in the front-and-rear direction of the vehicle body and the vehicle width direction, the manufacture irregularity can be absorbed by the seat fixing holes 52*c*, 52*d*, 52*f*. Accordingly, the assembling process of the seat-side hinge 52 to the seat 20 can be facilitated.

Figure 6:
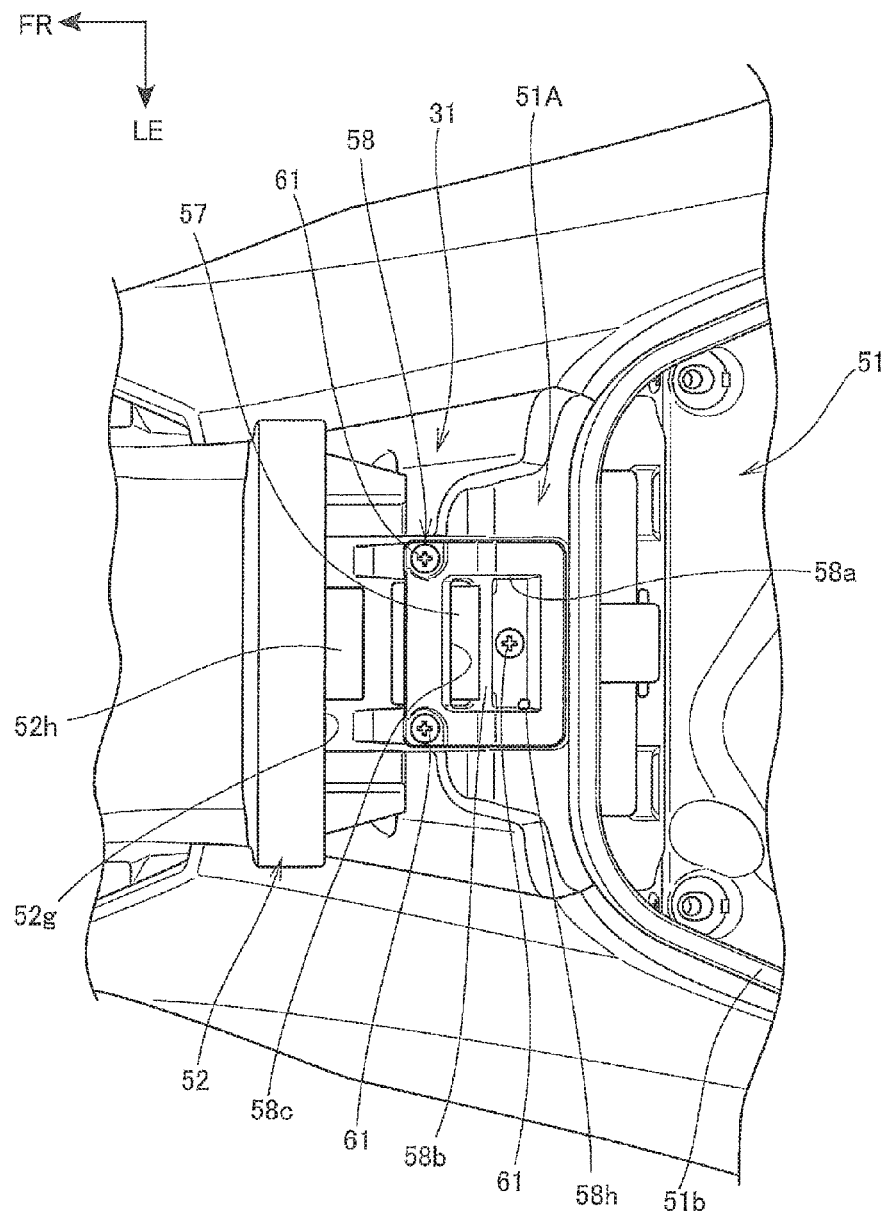
FIG. 6 is a plan view showing the seat hinge at a seat full-open position.

FIG. 6 is a plan view showing the seat hinge 31 at the seat full-open position.

The hinge plate 58 of the seat hinge 31 is a resin part whose outline is substantially rectangular in plan view, and secured to the vehicle-body-side hinge 51A with plural screws 61. A recess portion 58*a* is provided at the center in the vehicle width direction of the hinge plate 58. The front-side wall of the recess portion 58*a* is a sloped wall 58*b* which is formed so as to slope frontwards and upwards, and a rectangular opening portion 58*c* through which the laminated leaf spring 57 is exposed is formed in the sloped wall 58*b*.

A projecting portion 52*h* which is substantially equal to the laminated leaf spring 57 in the right-and-left width in the vehicle width direction and can come into contact with the laminated leaf spring 57 is formed in the lower face 52g of the seat-side hinge 52.

Figure 7:
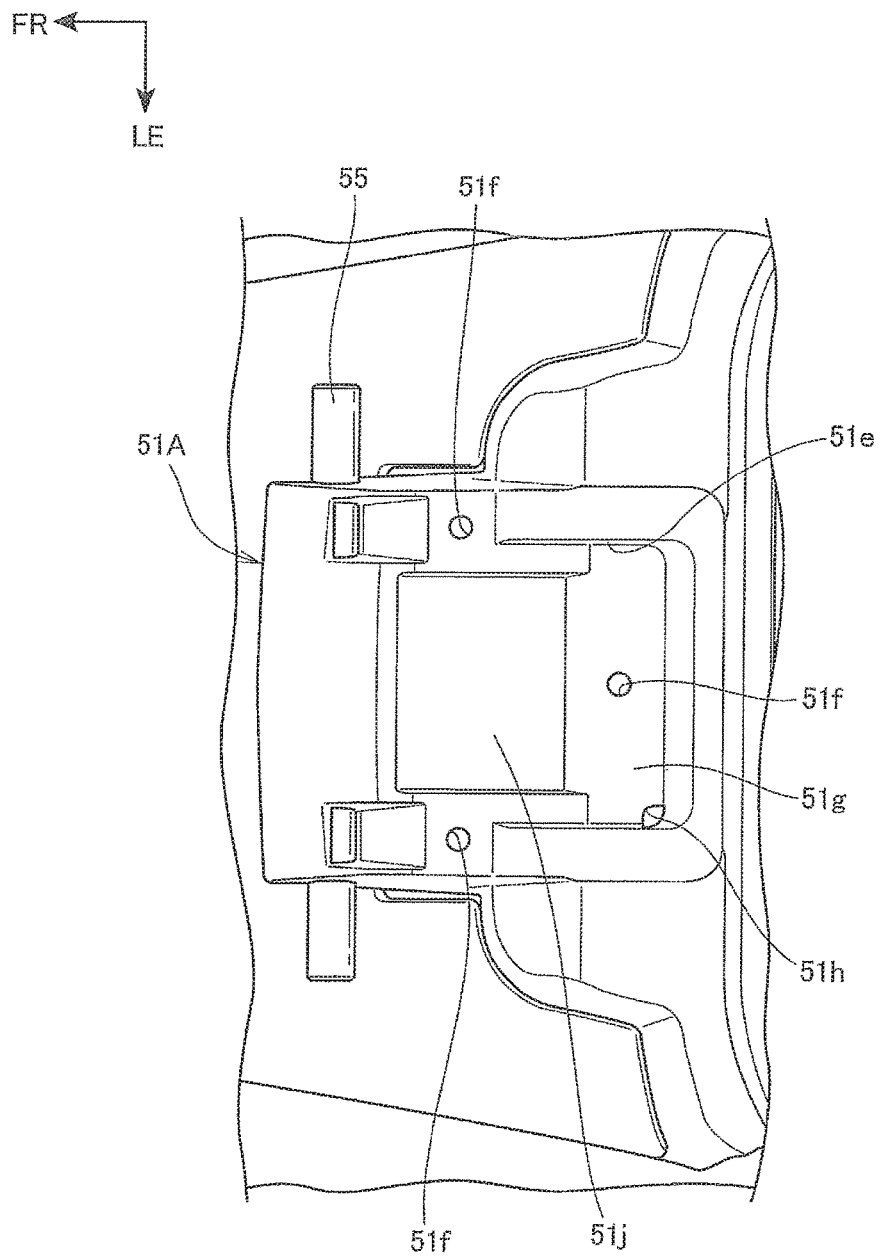
FIG. 7 is an enlarged plan view showing a state in which a seat-side hinge and a hinge plate are omitted from FIG. 6.

FIG. 7 is an enlarged plan view showing a state that the seat-side hinge 52 and the hinge plate 58 are omitted from FIG. 6.

A recess portion 51e is formed at the center in the vehicle width direction of the vehicle-body-side hinge 51A, and the hinge plate 58 (see FIG. 6) is inserted in the recess portion 51e. Screw holes 51f, 51f in which the screws 61 (see FIG. 6) for fixing the hinge plate 58 are inserted are formed at the edge of the recess portion 51e. A screw hole 51f is also formed in the bottom wall 51g of the recess portion 51e. A drain hole 51h is formed at the corner portion of the rear left side of the bottom wall 51g. The front wall 51j of the recess portion 51e slopes frontwards and upwards, and the laminated leaf spring 57 (see FIG. 4) is mounted on the front wall 51j.

Figure 8:
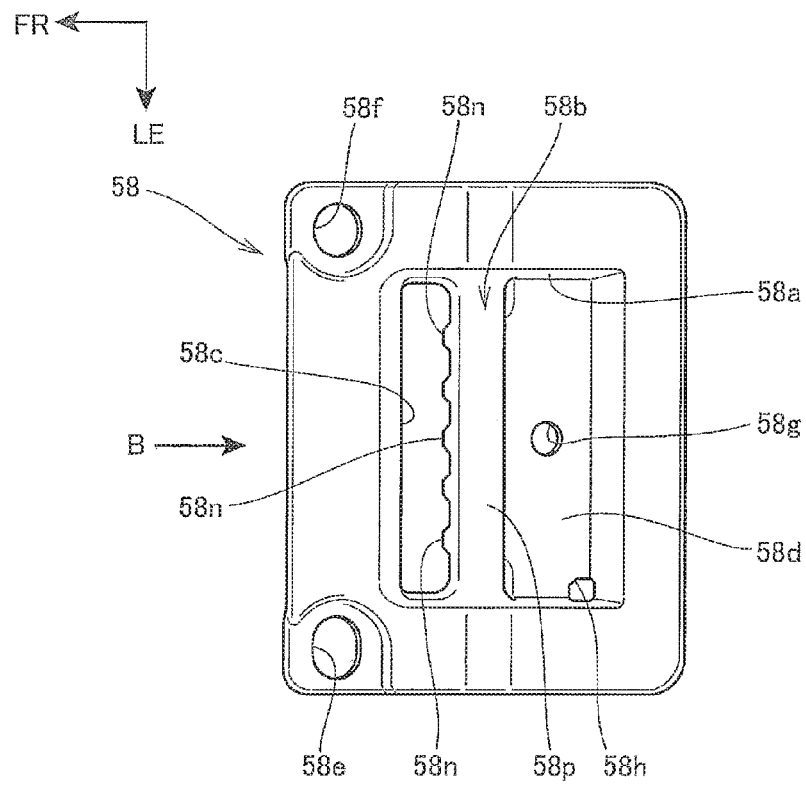
Figure 8:
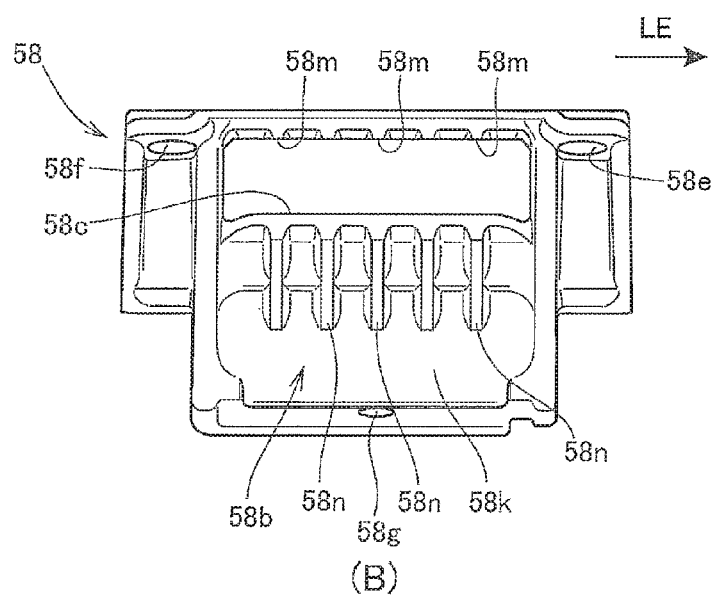

FIG. 8 is a diagram showing the hinge plate 58. FIG. 8(A) is a plan view showing the hinge plate, and FIG. 8(B) is a view taken along an arrow B of FIG. 8(A).

As shown in FIG. 8(A), screw insertion holes 58e, 58f, 58g in which the screws 61 (see FIG. 6) for fixing the hinge plate 58 to the seat-side hinge 52 (see FIG. 6) are formed at the right and left corner portions of the front portion of the hinge plate 58 and in the bottom wall 58d of the recess portion 58a. The screw insertion hole 58e at the left side out of the right and left screw insertion holes 58e, 58f is configured as the long hole elongated in the vehicle width direction, and the screw insertion hole 58f at the right side is configured as the round hole. Accordingly, when the screws 61 (see FIG. 6) are inserted into the screw insertion hole 58e and the screw hole 51 (see FIG. 7) of the vehicle-body-side hinge 51A (see FIG. 7), the manufacture irregularity (variation in the manufacturing processes) of the respective hole positions can be absorbed by the screw insertion hole 58e as the long hole. Accordingly, the configuration can be satisfied without enhancing the accuracy requirement, so that the manufacturing cost can be lowered.

A drain hole 58h is formed at the corner portion of the rear left side of the bottom wall 58d of the recess portion 58a. The drain hole 58h is vertically overlapped with the drain hole 51h of the vehicle-body-side hinge 51A shown in FIG. 7 so as to intercommunicate with the drain hole 51h. In FIG. 8(A), the opening portion 58c is formed at the front portion of the sloped wall 58b so that the right-and-left width in the vehicle width direction thereof is substantially equal to the right-and-left width of the recess portion 58a.

As shown in FIG. 8(B), plural upper ribs 58m and plural lower ribs 58n are integrally molded on the back surface 58k of the sloped wall 58b of the hinge plate 58.

The plural upper ribs 58m are formed on the upper edge of the opening portion 58c so as to be arranged in the vehicle width direction. The plural lower ribs 58n are formed on the lower edge of the opening portion 58c so as to extend in the up-and-down direction and be arranged in the vehicle width direction.

Figure 9:
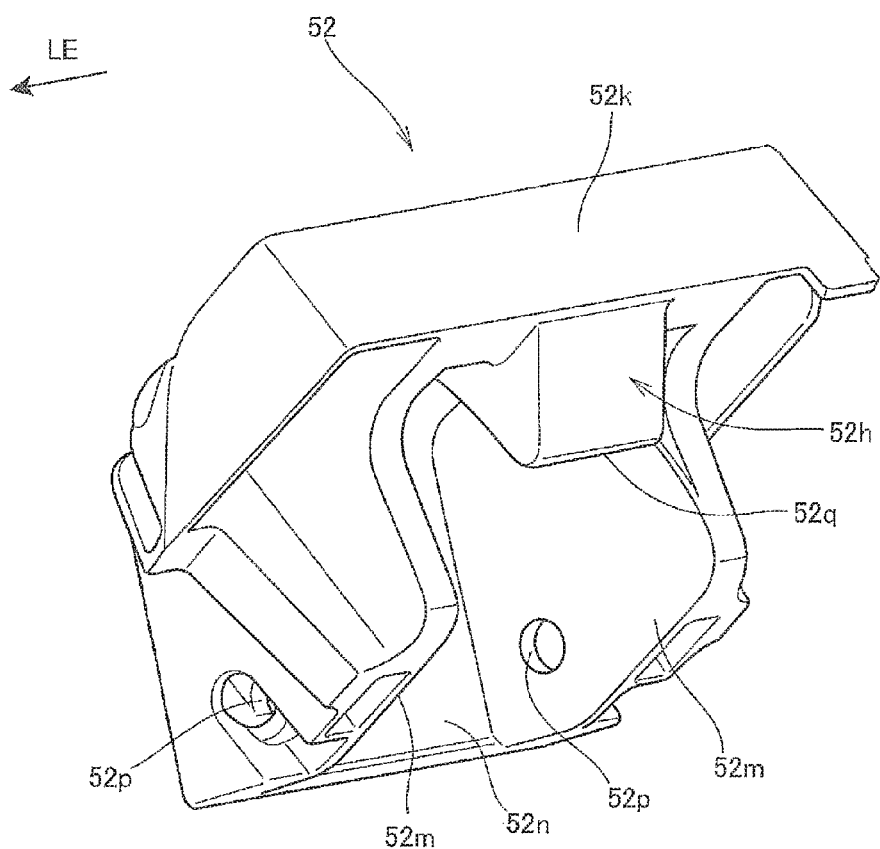
FIG. 9 is a perspective view showing the seat-side hinge.

FIG. 9 is a perspective view showing the seat-side hinge 52.

The seat-side hinge 52 has an upper base portion 52k, a pair of side walls 52m, 52m extending downwards from both the side end portions of the upper base portion 52k, a front wall 52n for connecting the front end portions of the pair of side walls 52m, 52m, and a projecting portion 52h projecting from the lower face 52g of the upper base portion 52k, these elements are formed integrally with one another.

Pin insertion holes 52p through which the hinge pin 55 (see FIG. 7) penetrates are formed in the side walls 52m, 52m. The projecting portion 52h is formed to be substantially rectangular in front view and substantially triangular in side view. Reference numeral 52q represents the top portion of the projecting portion 52h.

As described above, the seat-side hinge 52 is integrally formed in a substantially box-like shape, and thus it can secure enough rigidity to support the seat 20 (see FIG. 1).

Figure 10:
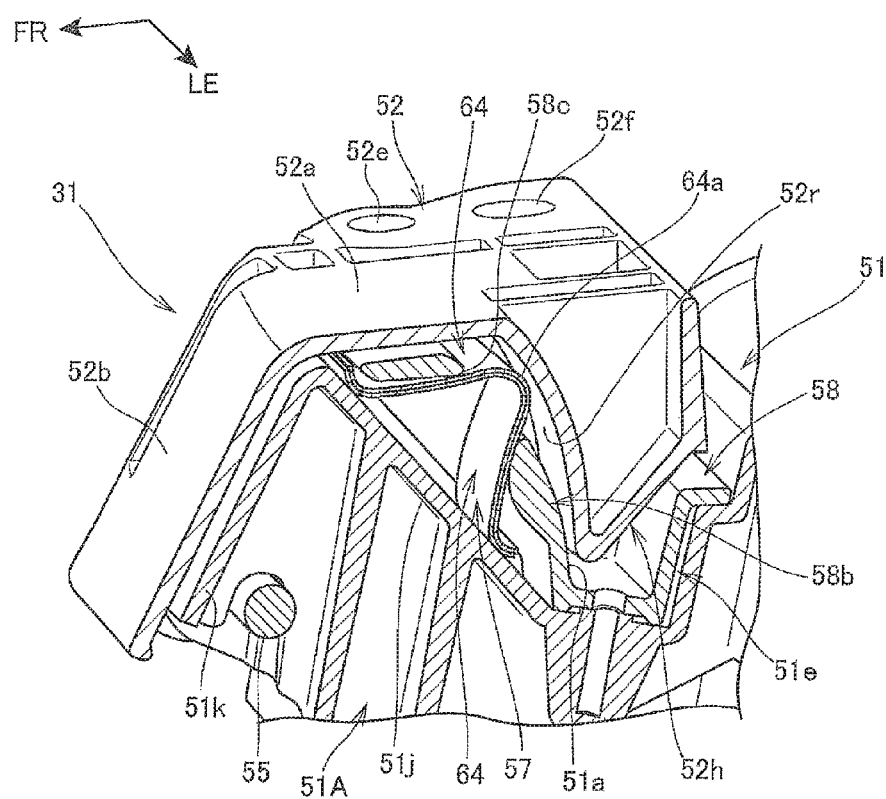
FIG. 10 is a perspective view showing the seat hinge.

FIG. 10 is a perspective view showing the seat hinge 31, and also is a cross-sectional view taken along X-X line of FIG. 5. In FIG. 10, the seat hinge 31 is set to the full-close position of the seat 20 (see FIG. 1).

The hinge plate 58 is inserted in the recess portion 51e of the vehicle-body-side hinge 51, and the laminated leaf spring 57 is held while sandwiched and deflected (warped) by the front wall 51j of the vehicle-body-side hinge 51 and the sloped wall 58B of the hinge plate 58. The top portion 64a of the laminated leaf spring 57 (the top portion 64a of the leaf spring 64) protrudes from the opening portion 58c of the hinge plate 58 to the projecting portion 52h side of the seat-side hinge 52.

The projecting portion 52h of the seat-side hinge 52 is accommodated in the recess portion 58a of the hinge plate 58, and the front side wall 52r forming the projecting portion 52h is disposed to come close to the top portion 64a of the laminated leaf spring 57 and the sloped wall 58b of the hinge plate 58.

Figure 11:
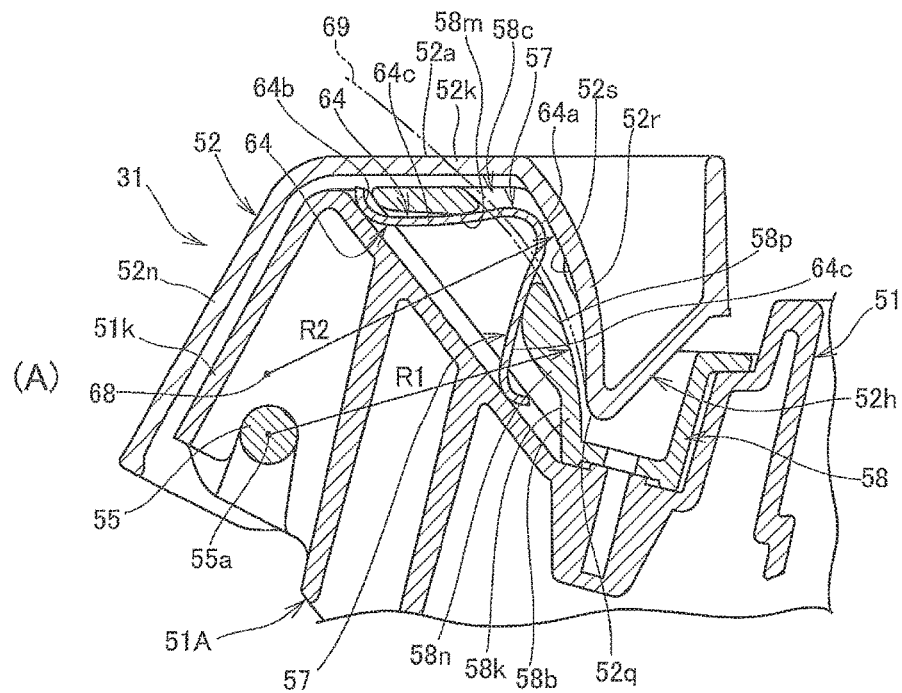
Figure 11:
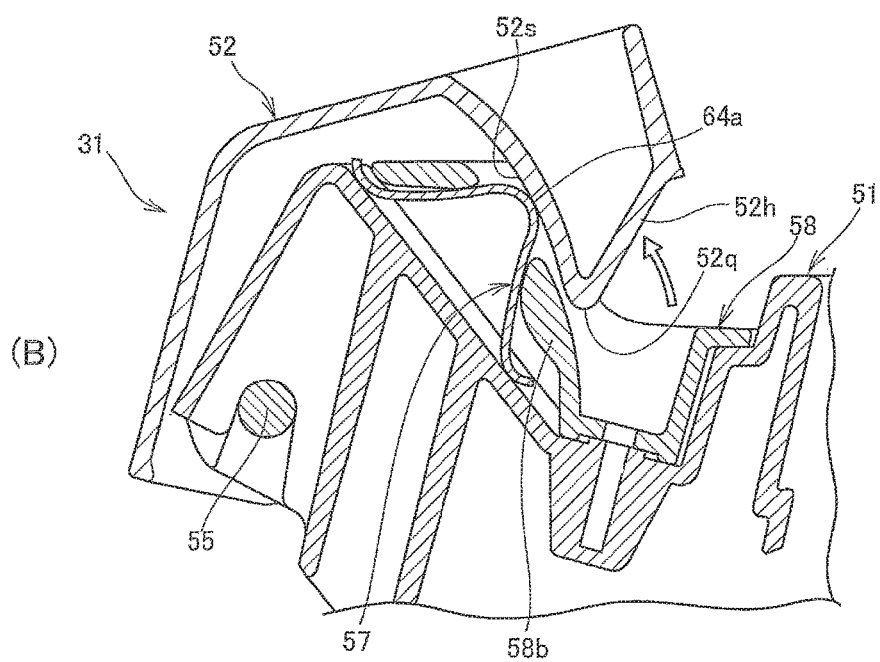
Figure 12:
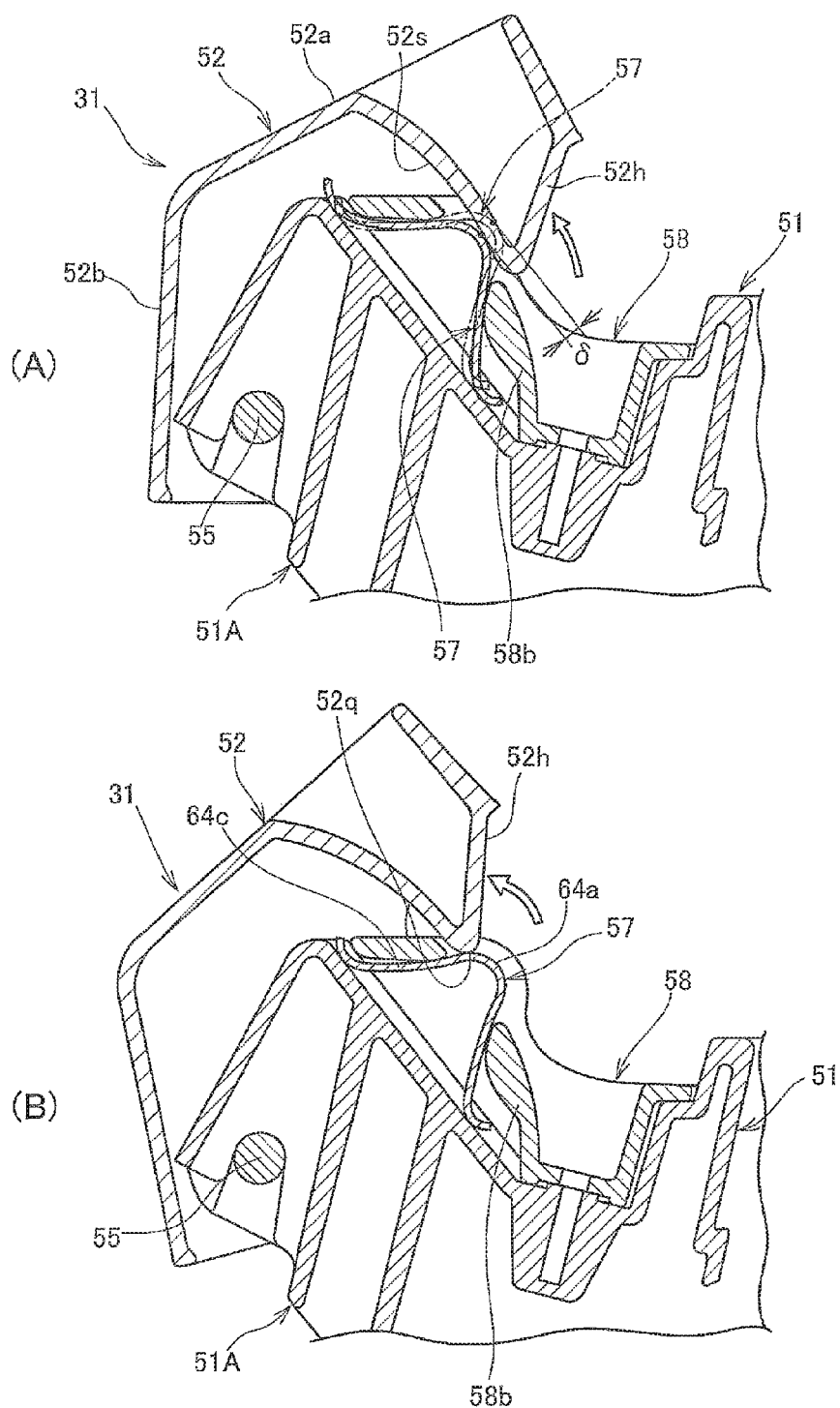
Figure 13:
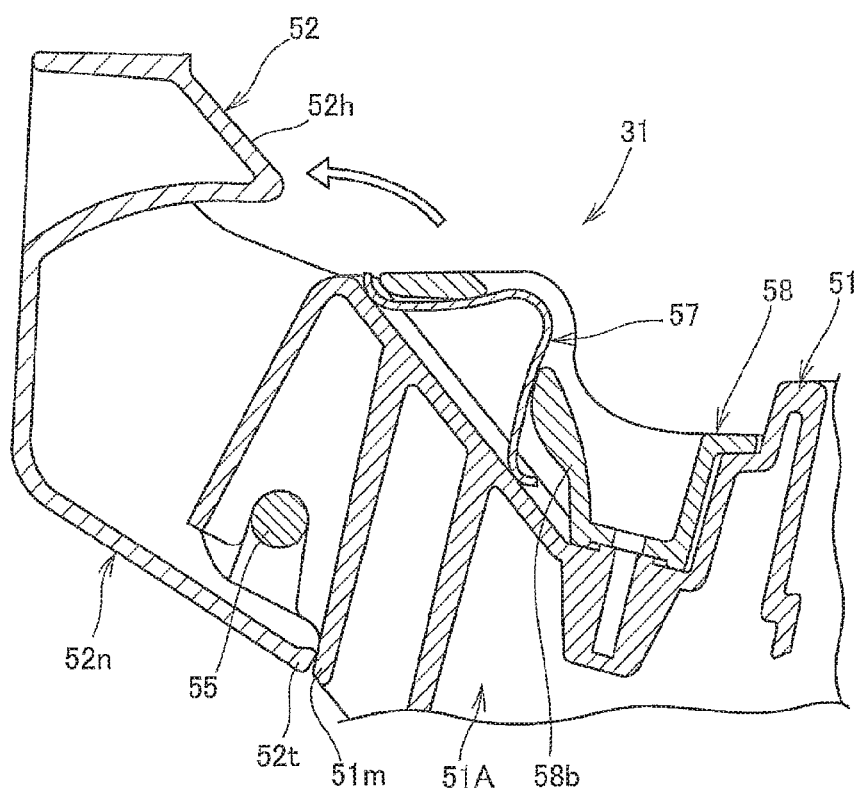
FIG. 13 is a third action diagram showing the operation of the seat-side hinge, and also is a left side view.

The operation of the seat-side hinge 52 as the action of the seat hinge 31 described above will be described. In FIGS. 11 to 13, the cross-section of the laminated leaf spring 57 is shown as the cross-section of one leaf spring for convenience.

FIG. 11 is a first action diagram showing the operation of the seat-side hinge 52, FIG. 11(A) is a cross-sectional view showing the seat hinge 31 at the full-close position A of the seat 20 shown in FIG. 1, and FIG. 11(B) is a first cross-sectional view showing a state that the seat-side hinge 52 is halfway rotated. The cross-section position corresponds to the X-X line cross-section shown in FIG. 5.

As shown in FIG. 11(A), the upper face 52a of the upper base portion 52k of the seat-side hinge 52 is substantially horizontal, and the front wall 52n is substantially parallel to the front end wall 51k of the vehicle-body-side hinge 51A. The front face 52s of the front side wall 52r of the projecting portion 52h is curved to be concaved in an arc-shape or substantially in an arc-shape, and proximate to the laminated leaf spring 57 and the sloped wall 58b of the hinge plate 58.

The sloped face 58p of the sloped wall 58b of the hinge plate 58 is formed to have an arc-shape of a radius R1 while the center thereof is set to the axial line 55a of the hinge pin 55, or formed to be substantially arc-shaped while the center thereof is substantially set to the axial line 55a of the hinge pin 55. Furthermore, the front face 52s of the projecting portion 52h of the seat-side hinge 52 is formed to have an arc-shape having a radius R2 while the center thereof is set to a point 68 located above the hinge pin 55, or formed to be substantially arc-shaped while the center thereof is substantially set to the point 68.

Reference numeral 69 represents a track drawn by the top portion 52q of the projecting portion 52h of the seat-side hinge 52 when the seat-side hinge 52 turns around the hinge pin 55. The front face 52s of the projecting portion 52h extends to be gradually away from the track 69 outwards in the radial direction as the seat 20 (see FIG. 1) is shifted in an opening direction. The top portion 64a of the laminated leaf spring 57 protrudes to the upper and rear side with respect to the track 69. Accordingly, the projecting portion 52*h* compresses the laminated leaf spring 57 by only the protrusion amount of the top portion 64*a*.

The upper ribs 58*m* and lower ribs 58*n* of the hinge plate 58 are configured so that the surfaces thereof are formed to have convex curved faces. Accordingly, when the laminated leaf spring 57 impinges against the upper ribs 58*m* and the lower ribs 58*n* and slides, local impingement of the laminated leaf spring 57 against the upper and lower ribs 58 can be prevented and thus the laminated leaf spring 57 can smoothly slide.

When the seat-side hinge 52 is turned from the state shown in FIG. 11(A) as indicated by a void arrow as shown in FIG. 1(B), the front face 52*s* of the projecting portion 52*h* of the seat-side hinge 52 impinges against the top portion 64*a* of the laminated leaf spring 57. The front face 52*s* of the projecting portion 52*h* extends so as to be gradually away from the turning track (locus) of the top portion 52*q* of the projecting portion 52*h* as the front face f52*s* of the projecting portion 52*h* is moved in the turning direction. Accordingly, when the seat-side hinge 52 is further turned from this state, the front face 52*s* of the projecting portion 52*h* slides while gradually presses the top portion 64*a* of the laminated leaf spring 57, and the laminated leaf spring 57 gradually warps such that the height of the top portion thereof descends.

FIG. 12 is a second action diagram showing the operation of the seat-side hinge 52. FIG. 12(A) is a second cross-sectional view showing a state that the seat-side hinge 52 is halfway turned, and FIG. 12(B) is a cross-sectional view showing the seat hinge 31 located at the intermediate position B of the seat 20 shown in FIG. 1. The cross-section position corresponds to the X-X line cross-section shown in FIG. 5.

When the seat-side hinge 52 is turned in the direction of the void arrow from the state shown in FIG. 11(B) as shown in FIG. 12(A), the laminated leaf spring 57 is compressed while sliding against the front face f52*s* of the projecting portion 52*h* of the seat-side hinge 52. Reference symbol δ in FIG. 12(A) represents the deflection (warp) amount of the laminated leaf spring 57.

The top portion 64*a* and the base portions 64*b*, 64*b* of the laminated leaf spring 57 have curved shapes. Therefore, when the projecting portion 52*h* slides against the laminated leaf spring 57 or when the laminated leaf spring 57 is warped and thus the base portions 64*b*, 64*b* slide on the front wall 51*j* of the vehicle-body-side hinge 51A, the sliding can be made smooth. Accordingly, the seat 20 (see FIG. 1) can be smoothly opened.

When the seat-side hinge 52 is turned from the state of FIG. 12(A) in the direction of the void arrow as shown in FIG. 12(B), the projecting portion 52*h* of the seat-side hinge 52 gets over the top portion 64*a* of the laminated leaf spring 57. Then, the top portion 52*q* of the projecting portion 52*h* is supported on the sloped portion 64*c* of the laminated leaf spring 57 (the sloped portion 64*c* of the leaf spring 64). This state corresponds to the holding state of the seat 20 at the intermediate position B, and the seat 20 which is leaning to the full-close side by its own weight is supported by the laminated leaf spring 57.

When external force is applied to the seat-side hinge 52 against the elastic force of the laminated leaf spring 57 in the opposite direction to the direction of the void arrow, the laminated leaf spring 57 is pressed against the projecting portion 52*h* of the seat-side hinge 52 and thus warped, so that the projecting portion 52*h* gets over the top portion 64*a* of the laminated leaf spring 57 again. Accordingly, the seat 20 can be easily leaned in the full-close direction.

FIG. 13 is a third action diagram showing the operation of the seat-side hinge 52, and is a cross-sectional view showing the seat hinge 31 at the full-open position C of the seat 20 shown in FIG. 1. The cross-section position corresponds to the X-X line cross-section of FIG. 5.

In the turning range of the seat-side hinge 52 from the full-close position of the seat 20 (see FIG. 1) shown in FIGS. 11 to 13, the projecting portion 52*h* of the seat-side hinge 52 and the laminated leaf spring 57 are kept in contact with each other from the contact start state shown in FIG. 11(B) to the holding state at the intermediate position of FIG. 12(B), and are away from each other at the other states. Accordingly, the seat hinge structure of the present invention can maximally reduce the time for which the load is applied to the laminated leaf spring 57. Therefore, the durability of the seat hinge structure can be more greatly enhanced as compared with the conventional hinge structure in which a rotating damper provided to a rotating shaft and a spiral spring are actuated at all times. Furthermore, wear-out and abrasion of the laminated leaf spring 57 can be suppressed, and the price of the laminated leaf spring 57 can be reduced.

As shown in FIGS. 1, 3 and 12(B), in the seat hinge structure for the two-wheeled motor vehicle as the saddle riding vehicle in which the seat 20 as a seat on which an occupant rides is configured to be freely opened and closed to the vehicle body side through the seat hinge 31 which is provided at one end of the seat 20 so as to be surrounded, the seat hinge 31 has the vehicle-body-side hinge 51A provided to the vehicle body side, and the seat-side hinge 52 which is turnably secured to the vehicle-body-side hinge 51A through the hinge pin 55. The seat-side hinge 52 has the projecting portion 52*h* extending toward the vehicle-body-side hinge 51A, the vehicle-body-side hinge 51A is provided with the laminate leaf spring 57 comprising the leaf springs 64 each having the top portion 64*a* as the projecting portion with which the projecting portion 52*h* can come into contact. When the seat 20 is opened, the projecting portion 52*h* gets over the top portion 64*a* of the leaf spring 64, whereby the seat-side hinge 52 is supported by the leaf spring 64, and the seat 20 is kept under the open state.

According to this construction of the present invention, it is unnecessary to wind the rotating damper, the spiral spring, etc. around the hinge pin unlike prior arts, and the seat-side hinge 52 is supported by the leaf springs 64. Therefore, the number of parts can be reduced. Furthermore, according to the present invention, when the seat 20 which is opened at the intermediate position between the full-close position and the full-open position is closed, it is unnecessary to temporarily further move the seat to the opening direction unlike the prior arts, and the seat can be easily closed from the holding position with its own weight by warping the leaf springs 64 through only the operation of moving the seat in the closing direction. As described above, the seat hinge 31 can be designed to have a simple structure, the cost can be reduced and the usability of the two-wheeled motor vehicle 10 can be enhanced.

As shown in FIG. 4, plural leaf springs 64 are laminated and provided as the laminated leaf spring 57. Therefore, the repulsive force of the whole of the leaf springs 64, that is, the laminated leaf spring 57 can be easily increased. Accordingly, the seat 20 can be held at the intermediate position between the full-close position and the full-open position without any member having high resistance to settling and without plastic deformation of the leaf springs 64. Accordingly, the seat hinge 31 can be configured at a low price.

As shown in FIGS. 4 and 11(A), the leaf spring 64 is a member having a substantially V-shaped cross-section, and disposed so that the opening of the V-shape faces the hinge pin 55. Therefore, the load applied to the leaf spring 64 can be dispersed by both the end portions of the V-shape. Accordingly, the plastic deformation of the leaf springs 64 can be suppressed.

Furthermore, as shown in FIG. 12(B) and FIG. 13, in the range from the full-close position A to the position C of the seat 20, the seat 20 is opened/closed while supported by only the hinge point 55, so that the seat hinge 31 can be designed in a simple structure. Furthermore, since the projecting portion 52h does not come into contact with the leaf spring 64, the abrasion of the leaf spring 64 can be suppressed. Therefore, the leaf spring 64 can be designed with a low-cost structure.

Furthermore, as shown in FIG. 11(A), the leaf spring 64 comes into contact with the projecting portion 52h and the vehicle-body-side hinge 51A through the curved surface thereof, and thus the leaf spring 64 can receive the load to be applied to the leaf spring 64 while dispersing the load. Accordingly, the abrasion of the leaf spring 64 can be prevented.

As shown in FIG. 10 and FIG. 11(A), the hinge plate 58 as the plate for supporting the leaf springs 64 is provided on the upper surface of the vehicle-body-side hinge 51A, the hinge plate 58 has the upper ribs 58m and the lower ribs 58n as the ribs having the curved faces curved along the leaf spring 64, and the leaf springs 64 are supported by the upper ribs 58m and the lower ribs 58n. Therefore, the leaf springs 64 can be supported by the curved surfaces of the hinge plate 58 which are curved along the leaf springs 64. Accordingly, when the leaf spring 64 slides, the local impingement can be prevented and thus the leaf spring 64 can slide smoothly, so that the seat 20 can be easily and smoothly closed from the holding state of the seat 20.

As shown in FIGS. 7, 8(A) and 11(A), the recess portion 51e as the concave portion in which the hinge plate 58 is inserted is formed on the vehicle-body-side hinge 51A, the recess portion 58a as the concave portion in which the projecting portion 52h is stored is formed on the hinge plate 58, and the recess portions 51e, 58a are provided with the drain holes 51h, 58h, respectively. Therefore, liquid such as rain water or the like which adheres to the projecting portion 52h of the seat-side hinge 52 and the hinge plate 58 can be collected and discharged from the drain holes 51h, 58h. Accordingly, corrosion of the leaf springs 64 fixed to the hinge plate 58 can be suppressed.

Furthermore, as shown in FIGS. 2 and 6, the storage box 51 as an article storage box provided below the seat 20 has the seal face 51b which comes into contact with the lower portion of the seat 20, and the seat hinge 31, specifically, the vehicle-body-side hinge 51A is disposed outside the seal face 51b. Therefore, the storage space of the storage box 51 can be increased by providing the seat hinge 31 between the front portion of the seat 20 and the seal face 51b.

As shown in FIG. 12(B), the hinge plate 58 has the opening portion 58c, and the projecting portion 52h of the seat-side hinge 52 can be supported by the top portion 64a of the leaf spring 64 projecting from the opening portion 58c. Therefore, the seat-side hinge 52 can be supported by the top portion 64a of the leaf spring 64 while the leaf spring 64 is pinched and held by the vehicle-body-side hinge 51A and the hinge plate 58.

Furthermore, as shown in FIGS. 8(A), (B), the plural upper and lower ribs 58m and 58n are formed at the edge of the opening portion 58c, specifically on the upper and lower edges of the opening portion 58c, and thus the sliding of the leaf spring 64 can be made smooth.

Furthermore, as shown in FIG. 11(A), the projecting portion 52h and the hinge plate 58 are formed of rein reinforced with glass fiber, so that rigidity and wear and abrasion resistance of the projecting portion 52h and the hinge plate 58 can be enhanced.

Furthermore, the leaf spring 64 is formed to be substantially V-shaped in cross-section and linearly symmetrical, Therefore, when the projecting portion 52h gets over the top portion 64a of the leaf spring 64, the load occurring in the leaf spring 64 can be equally dispersed into linearly symmetrical parts, so that the plastic deformation can be suppressed and the durability can be enhanced.

Furthermore, the hinge plate 58 has the sloped wall 58b as the frontward-ascending front wall which forms the recess portion 58a, a sloped face 59p as the front-side surface of the sloped wall 58b faces the seat-side hinge 52, the upper ribs 58m and the lower ribs 58n are formed on the back face 58k as the back-side surface of the sloped wall 58b, and the slope face 58p at the front side is overlapped with the arc drawn with the hinge pin 55 set as the center in side view. Therefore, the distance between the projecting portion 52h of the turning seat-side hinge 52 and the sloped wall 58b of the hinge plate 58 can be reduced while kept to a fixed value, and thus the seat hinge 31 can be miniaturized.

Furthermore, the front face 52s as the contact face of the projecting portion 52h capable of coming into contact with the top portion 64a of the leaf spring 64 is formed to be away from the turning track of the tip (the top portion 52q) of the projecting portion 52h as the front face 52s moves in the opening direction of the seat 20. Therefore, the front face 52s of the projecting portion 52h can be gradually brought into contact with the top portion 64a of the leaf spring 64 when the seat 20 is opened, and the leaf spring 64 can be gradually warped. Therefore, increase of the force applied when the seat 20 is opened can be moderated, whereby the seat 20 can be more easily opened. Accordingly, the usability of the two-wheeled motor vehicle 10 (see FIG. 1) can be enhanced.

As shown in FIGS. 2, 4 and 5, the plural seat fixing holes 52c, 52d, 52e, 52f in which the bolts 59 extending from the seat 20 side are inserted when the seat-side hinge 52 is secured to the seat 20 are formed in the upper base portion 52k as the base portion of the seat-side hinge 52. The seat fixing holes 52c, 52d, 52e, 52f comprise the seat fixing holes 52d and the 52e as the pair of round holes provided at one pair of diagonally confronting corner portions of the four corner portions of the substantially rectangular upper base portion 52k, and the seat fixing holes 52c and 52f as the pair of long holes provided at the other pair of diagonally confronting corner portions of the four corner portions. The seat fixing holes 52d and 52e as the pair of round holes are different in inner diameter from each other from each other. Therefore, even when there is some manufacture irregularity in the interval among the plural bolts 59 extending from the seat 20 side, the manufacture irregularity can be absorbed by the pair of long holes and the larger round hole. Accordingly, the seat-side hinge 52 can be easily assembled to the seat 20. Furthermore, the construction can be established without enhancing the accuracy requirement, so that the manufacturing cost can be lowered.

Furthermore, the seat fixing holes 52c, 52f as the pair of long holes are formed so that one of the fixing holes is longer in the front-and-rear direction of the vehicle body and the other fixing hole is longer in the vehicle width direction, thereby absorbing the manufacture irregularity of the intervals in the front-and-rear direction of the vehicle body and the vehicle width direction among the plural bolts 59 extending from the seat 20 side. Accordingly, the construction can be established without enhancing the accuracy requirement, and thus the manufacturing cost can be lowered.

The above-described embodiment is merely an example of the present invention, and thus any modification and application may be applied without departing from the subject matter of the present invention.

For example, in the above embodiment, the resin reinforced by the glass fiber is used for the projecting portion 52h and the hinge plate 58, but the present invention is not limited to this style. For example, the resin may be reinforced by carbon fiber. The carbon fiber may be applied to at least one of the projecting portion 52h and the hinge plate 58.

Furthermore, as shown in FIGS. 4 and 6, the hinge plate 58 is formed of resin. However, the present invention is not limited to this style, and the hinge plate 58 may be formed of metal. Furthermore, the leaf spring may be formed of resin.

In FIG. 10, the laminated leaf spring 57 is pinched between the vehicle-body-side hinge 51A and the hinge plate 58, whereby the laminated leaf spring 57 can be simply assembled and the productivity can be enhanced.

Furthermore, the seat hinge structure of the present invention may be applied to not only the seat of the two-wheeled motor vehicle, but also transport means having a hinge structure such as a vehicle, an airplane, a ship, a boat, an artificial satellite, etc., industrial products such as various kinds of machines, cases, lids, furniture, etc., architectures/building structures such as houses, buildings, bridges, etc., and articles used for other kinds of industries.

DESCRIPTION OF THE REFERENCE NUMERALS 10 two-wheeled motor vehicle (saddle riding vehicle)
20 seat
31 seat hinge
51 storage box (article storing box)
51A vehicle-body-side hinge
51b seal face
51e, 58a recess portion (concave portion)
51h, 58h drain hole
52 seat-side hinge
52c, 52d, 52e, 52f seat fixing hole (fixing hole)
52h projecting portion
52k upper base portion (base portion)
52s front face (contact face)
55 hinge pin
57 laminated leaf spring
58 hinge plate (plate)
58b sloped wall (front wall)
58c opening portion
58k back face (surface at back side)
58m upper rib (rib)
58n lower rib (rib)
58p sloped face (surface at front side)
59 bolt
64 leaf spring
64a top portion (convex portion)
69 track

The invention claimed is:

1. A seat hinge structure for a saddle riding vehicle in which an occupant-riding seat is freely opened and closed with respect to a vehicle body through a seat hinge provided to one end of the seat, characterized in that the seat hinge has a vehicle-body-side hinge provided to the vehicle body, and a seat-side hinge which is turnably secured to the vehicle-body-side hinge through a hinge pin, the seat-side hinge is provided with a projecting portion extending to the vehicle-body-side hinge, and the vehicle-body-side hinge is provided with a leaf spring having a convex portion capable of coming into contact with the projecting portion, whereby the projecting portion gets over the convex portion of the leaf spring when the seat is opened and the seat-side hinge is supported on the leaf spring to keep the seat under an open state.

2. The seat hinge structure for the saddle riding vehicle according to claim 1, wherein a plurality of leaf springs are laminated to form a laminated leaf spring.

3. The heat hinge structure for the saddle riding vehicle according to claim 1, wherein the leaf spring is a member having a substantially V-shaped cross-section, and is disposed so that an opening of the V-shape faces the hinge pin in side view.

4. The seat hinge structure for the saddle riding vehicle according to claim 1, wherein the seat is opened and closed while supported by only the hinge pin over the range from a seat holding state under which the seat is held at a halfway position between a full-close position and a full-open position of the seat to a seat full-open state under which the seat is fully opened.

5. The seat hinge structure for the saddle riding vehicle according to claim 1, wherein the leaf spring comes into contact with the projecting portion and the vehicle-body-side hinge through a curved face of the leaf spring.

6. The seat hinge structure for the saddle riding vehicle according to claim 1, wherein a plate for supporting the leaf spring is provided to the upper face of the vehicle-body-side hinge, the plate is provided with ribs having curved surfaces along the leaf spring, and the leaf spring is supported by the ribs.

7. The seat hinge structure for the saddle riding vehicle according to claim 6, wherein a recess portion in which the plate is inserted is formed on the vehicle-body-side hinge, a recess portion in which the projecting portion is mounted is formed on the plate, and each of both the recess portions is provided with a drain hole.

8. The seat hinge structure for the saddle riding vehicle according to claim 1, wherein an article storage box provided below the seat has a seal face which comes into contact with the lower portion of the seat, and the seat hinge is disposed outside the seal face.

9. The seat hinge structure for the saddle riding vehicle according to claim 6, wherein the plate has an opening portion (58c), and the projecting portion of the seat-side hinge can be supported by a projecting portion of the leaf spring which projects from the opening portion (58c).

10. The seat hinge structure for the saddle riding vehicle according to claim 1, wherein the leaf spring is formed to be linearly symmetrical in cross-section.

11. The seat hinge structure for the saddle riding vehicle according to claim 6, wherein the plate has a frontwards ascending front wall forming the recess portion, a surface at the front side of the front wall faces the seat-side hinge, the ribs are formed on a surface at the back side of the front wall, and the surface at the front side is overlapped with an arc drawn with the hinge pin as the center thereof in side view.

* * * * *